United States Patent
Ashok et al.

(10) Patent No.: US 9,524,120 B2
(45) Date of Patent: *Dec. 20, 2016

(54) ALLOCATION AND BALANCING OF STORAGE RESOURCES

(71) Applicant: International Business Machines Corporation, Armonk, NY (US)

(72) Inventors: Rohith K. Ashok, Durham, NC (US); Roy F. Brabson, Raleigh, NC (US); Wei L. Chan, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,145

(22) Filed: Jun. 20, 2014

(65) Prior Publication Data
US 2014/0304437 A1    Oct. 9, 2014

Related U.S. Application Data

(63) Continuation of application No. 13/765,619, filed on Feb. 12, 2013, now Pat. No. 8,793,372, which is a
(Continued)

(51) Int. Cl.
*G06F 15/173* (2006.01)
*G06F 3/06* (2006.01)
(Continued)

(52) U.S. Cl.
CPC ............ *G06F 3/0631* (2013.01); *G06F 3/061* (2013.01); *G06F 3/067* (2013.01); *G06F 3/0613* (2013.01);
(Continued)

(58) Field of Classification Search
None
See application file for complete search history.

(56) References Cited

U.S. PATENT DOCUMENTS 7,085,883 B1 * 8/2006 Dalgic .................. G06F 3/0617
    711/114
7,181,578 B1    2/2007 Guha et al.
(Continued)

FOREIGN PATENT DOCUMENTS

WO    2004088547    10/2004
WO    2009134600    11/2009

*Primary Examiner* — Joseph E Avellino
*Assistant Examiner* — Tsung Wu
(74) *Attorney, Agent, or Firm* — James L. Baudino

(57) ABSTRACT

A method and technique for allocation and balancing of storage resources includes: determining, for each of a plurality of storage controllers, an input/output (I/O) latency value based on an I/O latency associated with each storage volume controlled by a respective storage controller; determining network bandwidth utilization and network latency values corresponding to each storage controller; responsive to receiving a request to allocate a new storage volume, selecting a storage controller having a desired I/O latency value; determining whether the network bandwidth utilization and network latency values for the selected storage controller are below respective network bandwidth utilization and network latency value thresholds; and responsive to determining that the network bandwidth utilization and network latency values for the selected storage controller are below the respective thresholds, allocating the new storage volume to the selected storage controller.

20 Claims, 7 Drawing Sheets

Related U.S. Application Data continuation of application No. 13/365,793, filed on Feb. 3, 2012, now Pat. No. 8,788,658.

(51) Int. Cl.
  *G06F 15/17* (2006.01)
  *G06F 9/50* (2006.01)
  *H04L 29/08* (2006.01)

(52) U.S. Cl.
  CPC ........... *G06F 3/0653* (2013.01); *G06F 3/0658* (2013.01); *G06F 9/5011* (2013.01); *G06F 15/17* (2013.01); *H04L 67/10* (2013.01)

(56) References Cited

U.S. PATENT DOCUMENTS

| | | |
|---|---|---|
| 7,856,541 B2 | 12/2010 | Kaneda et al. |
| 7,984,259 B1 | 7/2011 | English |
| 2003/0172146 A1 | 9/2003 | Collins |
| 2005/0050139 A1* | 3/2005 | Creamer ............. H04L 67/1008 709/200 |
| 2005/0125456 A1* | 6/2005 | Hara et al. .................... 707/200 |
| 2005/0246441 A1* | 11/2005 | Chandrasekaran et al. .. 709/226 |
| 2007/0038678 A1* | 2/2007 | Allen et al. ................... 707/200 |
| 2007/0192382 A1 | 8/2007 | Harris |
| 2008/0086516 A1 | 4/2008 | Claborn et al. |
| 2010/0217949 A1 | 8/2010 | Schopp et al. |
| 2010/0332262 A1 | 12/2010 | Horvitz et al. |
| 2011/0016214 A1 | 1/2011 | Jackson |
| 2011/0231899 A1 | 9/2011 | Pulier et al. |
| 2011/0314069 A1 | 12/2011 | Alatorre et al. |
| 2012/0066449 A1* | 3/2012 | Colgrove et al. ............. 711/114 |
| 2013/0159637 A1* | 6/2013 | Forgette ................ G06F 3/0605 711/154 |

\* cited by examiner

ALLOCATION AND BALANCING OF STORAGE RESOURCES

BACKGROUND

In cloud and other types of computing systems, a customer or user may request that a storage volume be allocated so it may be used by one or more virtual machines (i.e., a virtualized allocation of shared computer resources). For example, in response to a request to allocate a storage volume, cloud computing systems may locate a storage controller with sufficient space from which to allocate the new storage volume.

BRIEF SUMMARY

According to one aspect of the present disclosure a method and technique for allocating and balancing storage resources is disclosed. The method includes: determining, for each of a plurality of storage controllers, an input/output (I/O) latency value based on an I/O latency associated with each storage volume controlled by a respective storage controller; determining a network bandwidth utilization value and a network latency value corresponding to each storage controller; responsive to receiving a request to allocate a new storage volume, selecting a storage controller having a desired I/O latency value; determining whether the network bandwidth utilization value and the network latency value for the selected storage controller are below a respective network bandwidth utilization threshold and a network latency value threshold; and responsive to determining that the network bandwidth utilization value and the network latency value for the selected storage controller are below the respective network bandwidth utilization threshold and network latency value threshold, allocating the new storage volume to the selected storage controller.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
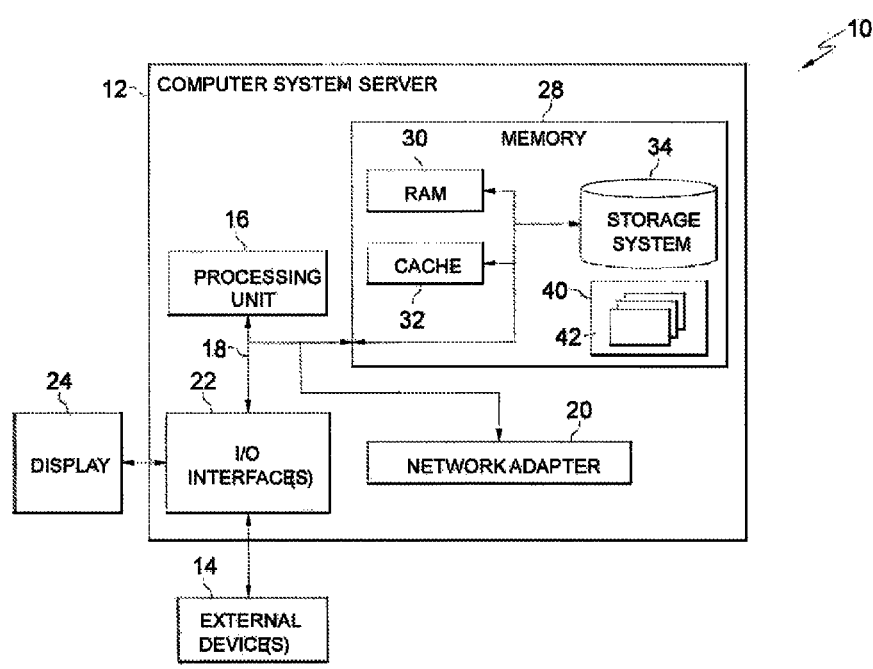
FIG. 1 depicts a cloud computing node according to an embodiment of the present invention.

Embodiments of the present disclosure provide a method, system and computer program product for allocating and balancing storage resources. For example, in some embodiments, the method and technique includes: determining, for each of a plurality of storage controllers, an input/output (I/O) latency value based on an I/O latency associated with each storage volume controlled by a respective storage controller; determining a network bandwidth utilization value and a network latency value corresponding to each storage controller; responsive to receiving a request to allocate a new storage volume, selecting a storage controller having a desired I/O latency value; determining whether the network bandwidth utilization value and the network latency value for the selected storage controller are below a respective network bandwidth utilization threshold and a network latency value threshold; and responsive to determining that the network bandwidth utilization value and the network latency value for the selected storage controller are below the respective network bandwidth utilization threshold and network latency value threshold, allocating the new storage volume to the selected storage controller. Thus, embodiments of the present disclosure enable efficient management of storage resources by monitoring and managing storage pool resources to maximize and/or otherwise maintain desired performance levels associated with operation response times. For example, embodiments of the present disclosure monitor I/O latency, network latency and network bandwidth utilization to determine storage volume placement and allocation. Further, embodiments of the present disclosure monitor I/O latency, network latency and network bandwidth utilization to determine whether storage volumes should be re-allocated and/or rebalanced among system storage controllers to reduce and/or minimize I/O latency, network latency and/or network bandwidth utilization for storage resources. Embodiments of the present disclosure may also monitor and/or analyze network resources (e.g., a quantity of network hops via switches, routers and/or other data transition points) to improve and/or maximize storage performance.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
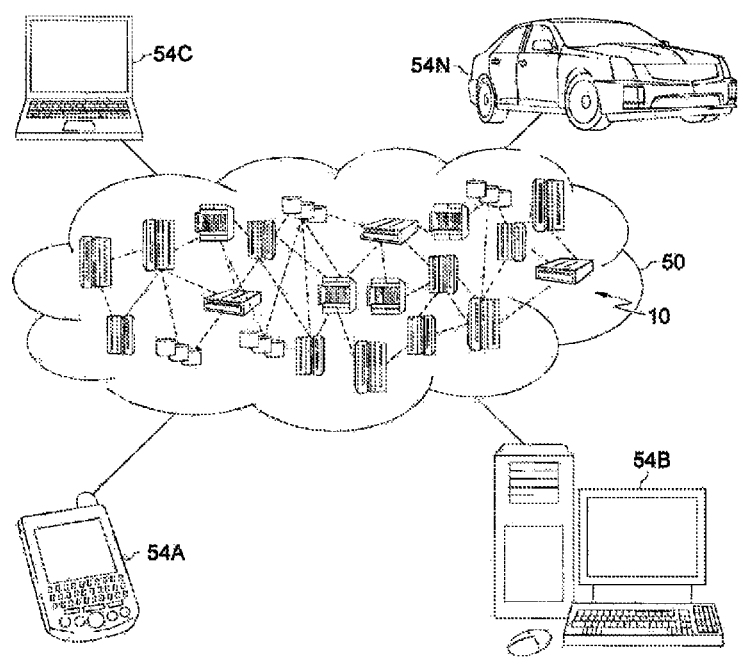
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
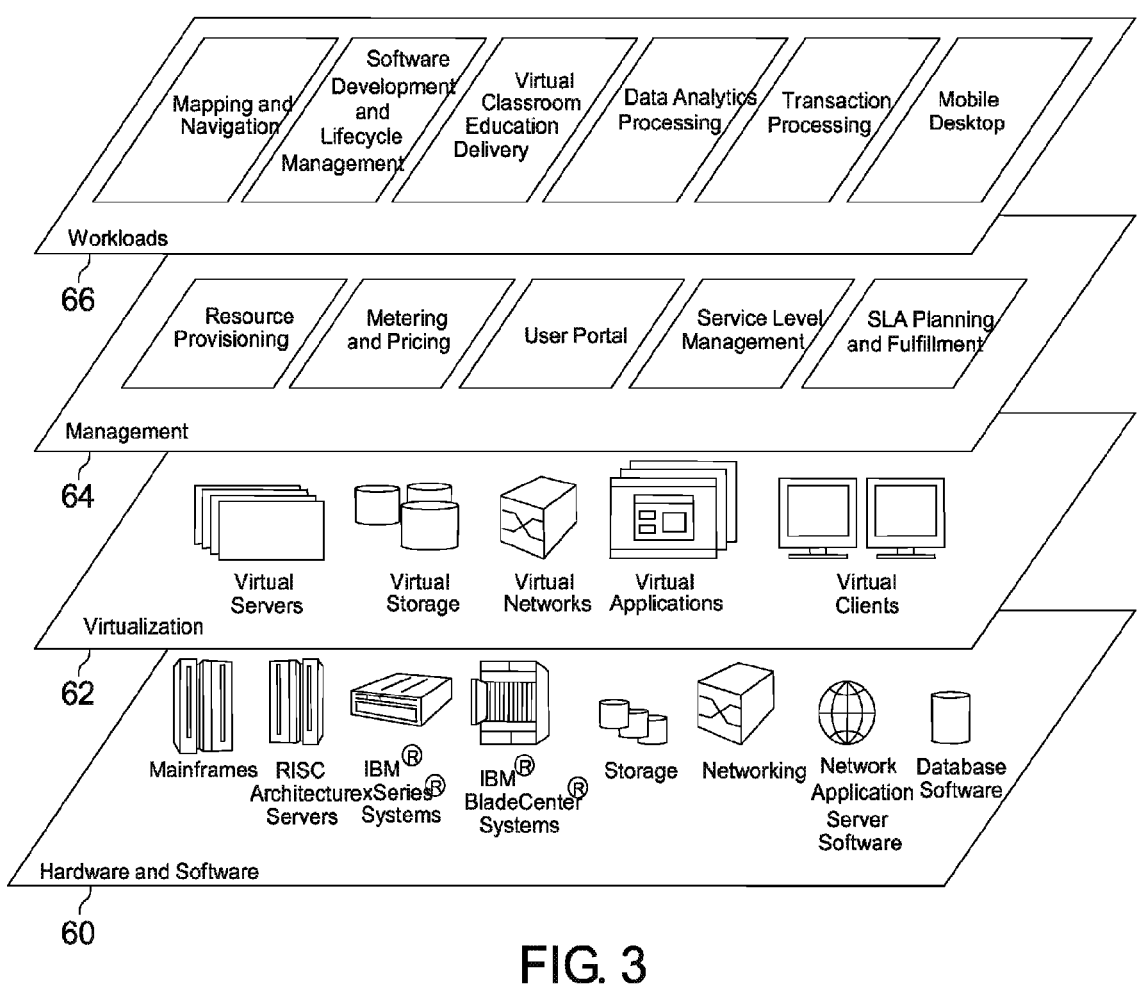
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual machines, including virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA. Service level management may also include virtual machine allocation and management such that the migration and/or execution of virtual machine resources (e.g., various workload or application processing) complies with the geophysical host location.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop functions.

Figure 4:
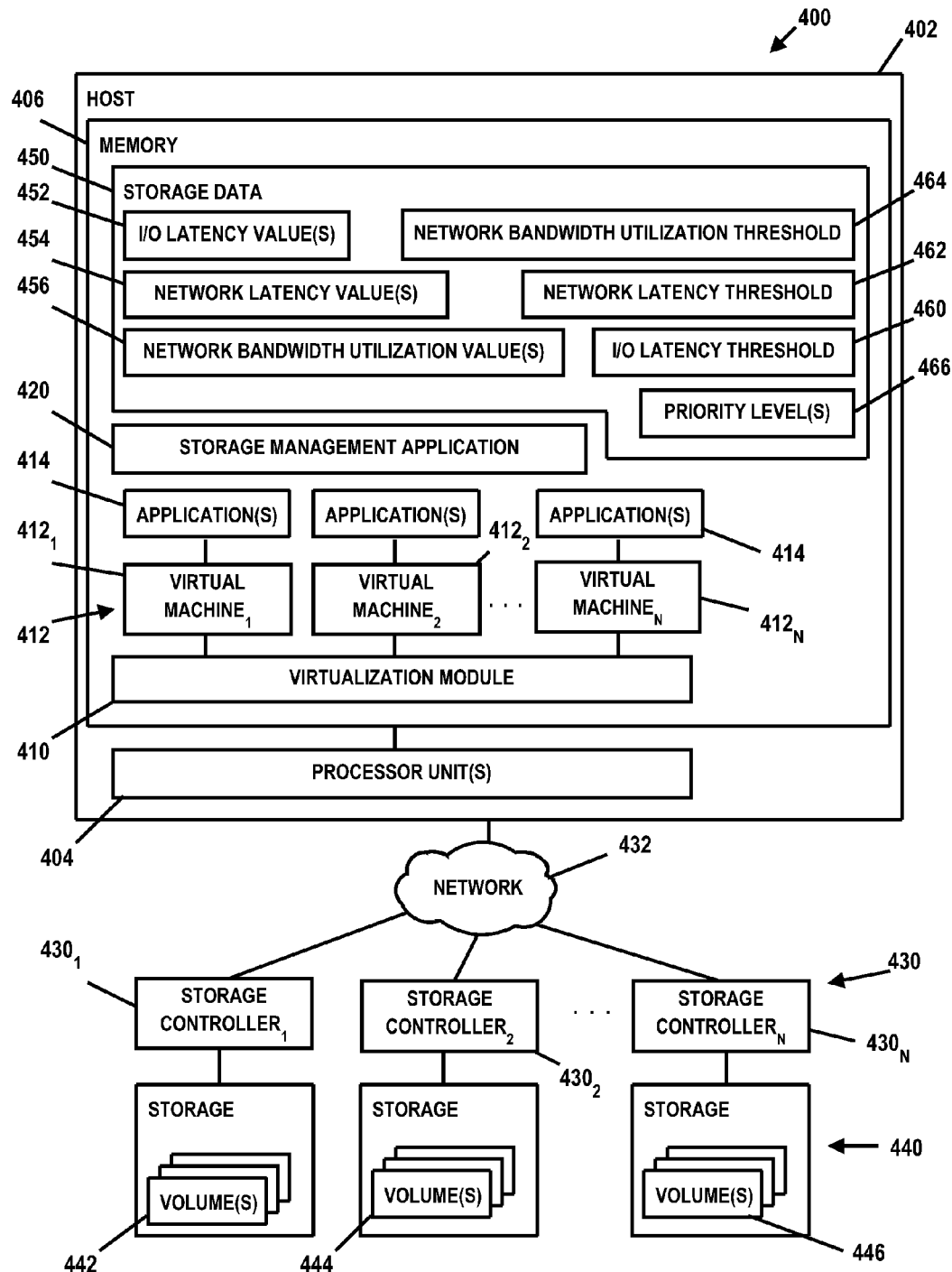
FIG. 4 depicts an embodiment of a data processing system in which illustrative embodiments of a system for allocating and balancing storage resources may be implemented.

FIG. 4 is an illustrative embodiment of a system 400 for storage management in a cloud or other type of computing environment. System 400 may be implemented on data processing systems or platforms such as, but not limited to, node 10 or at other data processing system locations. System 400 (e.g., all or portions thereof) may be implemented, for example, on hardware and software layer 60 and/or on management layer 64 as depicted in FIG. 3. In the embodiment illustrated in FIG. 4, system 400 comprises a host 402 comprising a physical computer or any type of data processing platform. Host 402 includes one or more processor units 404 (e.g., CPU) capable of reading and executing instructions and/or running a variety of types of applications and a memory 406. In FIG. 4, memory comprises a hypervisor or virtualization module 410 for logically dividing and/or virtualizing various resources of host 402 (e.g., sharing of memory 406 and/or processor units 404). Virtualization module 410 generally comprises a low-level application that supports allocation and/or execution of one or more virtual machines 412 (e.g., virtual machines (VMs) $412_1$, $412_2$ through $412_n$). For example, virtualization module 410 may include an allocation manager for allocating and/or logically dividing and virtualizing computer resources (including the allocation and/or sharing of one or more processing units and/or memory) to thereby form a platform for each of the respective virtual machines 412. Multiple virtual machines 412 may be allocated on host 402. Each virtual machine 412 may respectively support an instance of an operating system and one or more applications 414 executable on the virtual processing device allocated to the respective virtual machine 412.

In the embodiment illustrated in FIG. 4, memory also comprises a storage management application 420 for managing various storage-related functions as described herein. Virtualization module 410 and management application 420 may be implemented in any suitable manner that may be hardware-based, software-based, or some combination of both. For example, virtualization module 410 and management application 420 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). Management application 420 is configured to obtain, analyze and monitor various criteria related to the selection and/or distribution of storage resources and/or the control of those storage resources. For example, in FIG. 4, system 400 includes storage controllers 430 (e.g., storage controllers $430_1$, $430_2$ through $412_n$) connected to host 402 via a network 432. Each storage controller 430 may be associated with and/or otherwise manage/control storage resources 440. The storage resources 440 may comprise storage volumes 442, 444 and 446 (e.g., corresponding to physical storage devices).

Management application 420 acquires and/or otherwise calculates various types of statistical data corresponding to each storage controller 430 to determine placement of new storage volumes and/or the distribution/rebalancing of storage volumes among storage controllers 430. For example, in FIG. 4, memory comprises storage data 450 comprising information associated with and/or otherwise related to each storage controller 430. In the illustrated embodiment, storage data 450 comprises an input/output (I/O) latency value (s) 452, a network latency value(s) 454, and a network bandwidth utilization value(s) 456. I/O latency value 452 comprises a value representing the latency of storage input/output operations corresponding to a respective storage controller 430. For example, in some embodiments, an average I/O latency value is calculated by management application 420 based on input/output operations corresponding to each storage volume controlled by a particular storage controller. In this example, management module 420 polls a particular storage controller 430 (e.g., storage controller $430_1$) to gather I/O statistics corresponding to each storage volume 442 managed/controlled by storage controller $430_1$, such as the average read and write response times for a particular storage volume 442. Management application 420 calculates the average I/O latency for each storage volume 442, sums the average latencies for the storage volumes 442 controlled/managed by storage controller $430_1$, and divides by the quantity of storage volumes 442 controlled/managed by storage controller $430_1$. Thus, in this manner, an average I/O latency value 452 may be calculated/determined for each storage controller 430 based on the storage volumes controlled/managed by the respective storage controller 430. In some embodiments, management application 420 may weight each storage volume by the amount of data being read/written to a respective storage volume (e.g., so a storage volume that writes one byte of data and gets a high latency will not skew the overall latency of the respective storage controller 430). In some embodiments, the I/O latency value may comprise and/or be based on a weighted average of I/O response times. For example, in some embodiments, write operations may be weighted greater than read operations, or vice versa (e.g., write operations weighted at 70% and read operations weighted at 30%). Further, in some embodiments, the quantity or rate of I/O operations may be weighted (e.g., a storage volume with a significant quantity or rate of I/O operations given more weight than a storage volume with low quantity or rate of I/O operations). The weighting may be configurable (e.g., by a user of system 400) to obtain desired statistical information corresponding to I/O operations.

Network latency value 454 comprises a value representing an operation response time based on network characteristics corresponding to a respective storage controller 430. For example, in some embodiments, management application 420 polls network resources and/or otherwise acquires various statistical information corresponding to network devices (e.g., switches, links, relays, I/O adapters, etc.) corresponding to a network utilized by and/or otherwise associated with operations performed by a respective storage controller 430. Network bandwidth utilization value 456 comprises a value representing the bandwidth utilization otherwise associated with operations performed by a respective storage controller 430.

In operation, management application 420 monitors and/or calculates the I/O latency value 452, network latency value 454 and the network bandwidth utilization value 456 for each storage controller 430. In response to a request to allocate a new storage volume in system 400 (e.g., by a virtual machine 412 and/or other resource, management application 420 determines where to allocate the new storage volume (i.e., to which storage controller 430) to optimize and/or maximize performance of storage controllers 430 in system 400. For example, in the embodiment illustrated in FIG. 4, memory 406 may also include an I/O latency threshold, 460, a network latency threshold 462 and a network bandwidth utilization threshold 464 associated with respective I/O latency value 452, network latency value 454 and network bandwidth utilization value 456. Management application 420 may analyze the I/O latency value 452, network latency value 454 and network bandwidth utilization value 456 for each storage controller 430 to respective I/O latency threshold, 460, network latency threshold 462 and network bandwidth utilization threshold 464 to determine whether a performance degradation would occur if a storage volume was allocated to a particular storage controller 430. For example, if the I/O latency value 452 for a particular storage controller 430 is near or has exceeded I/O latency threshold 460, a different storage controller 430 may be selected for the new storage volume. In some embodiments, in response a request to allocate a new storage volume in system 400, management application 420 may select a particular storage controller 430 with a desired I/O latency value 452 for new storage volume allocation (e.g., the storage controller 430 with the lowest I/O latency value 452, one or more storage controllers 430 having an I/O latency value 452 below a particular threshold, etc.). In some embodiments, after identifying/selecting a particular storage volume 430 based on I/O latency value 452, management application 420 may verify that a corresponding network latency value 454 and network bandwidth utilization value 456 for the identified storage controller 430 are also below the network latency threshold 462 and network bandwidth utilization threshold 464. I/O latency threshold 460, network latency threshold 462 and network bandwidth utilization threshold 464 may be configurable and/or may be defined by a user of system 400. It should be understood that in some embodiments, if there is a minimum difference (or amount of difference below some threshold) of I/O latency values 452 between two or more storage controllers 430, multiple storage controllers 430 may be analyzed (e.g., a particular storage controller 430 may not be selected over another storage controller 430 with minimal I/O latency value 452 differences).

In some embodiments, management application 420 may also evaluate and/or consider a type of application 414 and its use of storage resources in determining where to allocate a new storage volume and/or rebalance storage volumes among storage controllers 430. For example, in some embodiments, management application 420 may determine a type of application 414 and it current and/or anticipated storage workload level (e.g., some application 414 may have a light storage workload level where other applications 414 may have higher storage workload demands). Management application 420 may evaluate the type of application 414 that is or will be utilizing a storage volume to determine where to allocate a new storage volume and/or rebalance current storage volume placement among storage controllers. In some embodiments, management application 420 may also determine, monitor and/or analyze a quantity of network hops (e.g., via switches, routers and/or other data transition points) between a particular virtual machine 412 and a corresponding storage volume to determine placement of a new storage volume and/or the rebalancing of storage volumes among storage controllers 430 (e.g., migrating storage volumes to minimize the quantity of network hops).

In some embodiments, management application 420 may also evaluate and/or consider a priority level associated with a particular application 414 and its use of storage resources in determining where to allocate a new storage volume and/or rebalance storage volumes among storage controllers 430. For example, in some embodiments, a user, administrator or other resource may assign and/or otherwise delegate a priority level(s) 466 to different applications 414. Management application 420 evaluates priority level 466 corresponding to a particular application 414 (e.g., in connection with either allocating a new storage volume or evaluating whether to rebalance storage volumes) to minimize impact and/or maximize performance corresponding to the higher priority applications 414. In this embodiment, for example, if one or more of I/O latency value 452, network latency value 454 and network bandwidth utilization value 456 for a corresponding storage controller 430 (e.g., storage controller 430$_1$) managing a storage volume associated with the high priority level application 414 is nearing and/or has exceeded a respective threshold 460, 462 or 464, management application 420 may cause other storage volumes on the respective storage controller 430$_1$ to be migrated to other storage controllers 430 (e.g., storage controller 430$_2$) to maximize performance for the higher level priority application 414. Management application 420 may also consider and/or otherwise evaluate the proximity of a particular storage controller 430 to a virtual machine 412 that is utilizing a particular storage controller 430 to reduce bandwidth utilization and minimize latencies.

As described above, management application 420 may also monitor I/O latency value 452, network latency value 454 and network bandwidth utilization value 456 for each storage controller 430 and rebalance and/or redistribute storage volumes among the different storage controllers 430 to maximize performance. For example, in response to network failures, increases in storage workloads (e.g., storage and/or network bandwidth usage), re-prioritization of applications 414, etc., management application 420 may migrate one or more storage volumes from one storage controller 430 to another storage controller 430.

Figure 5:
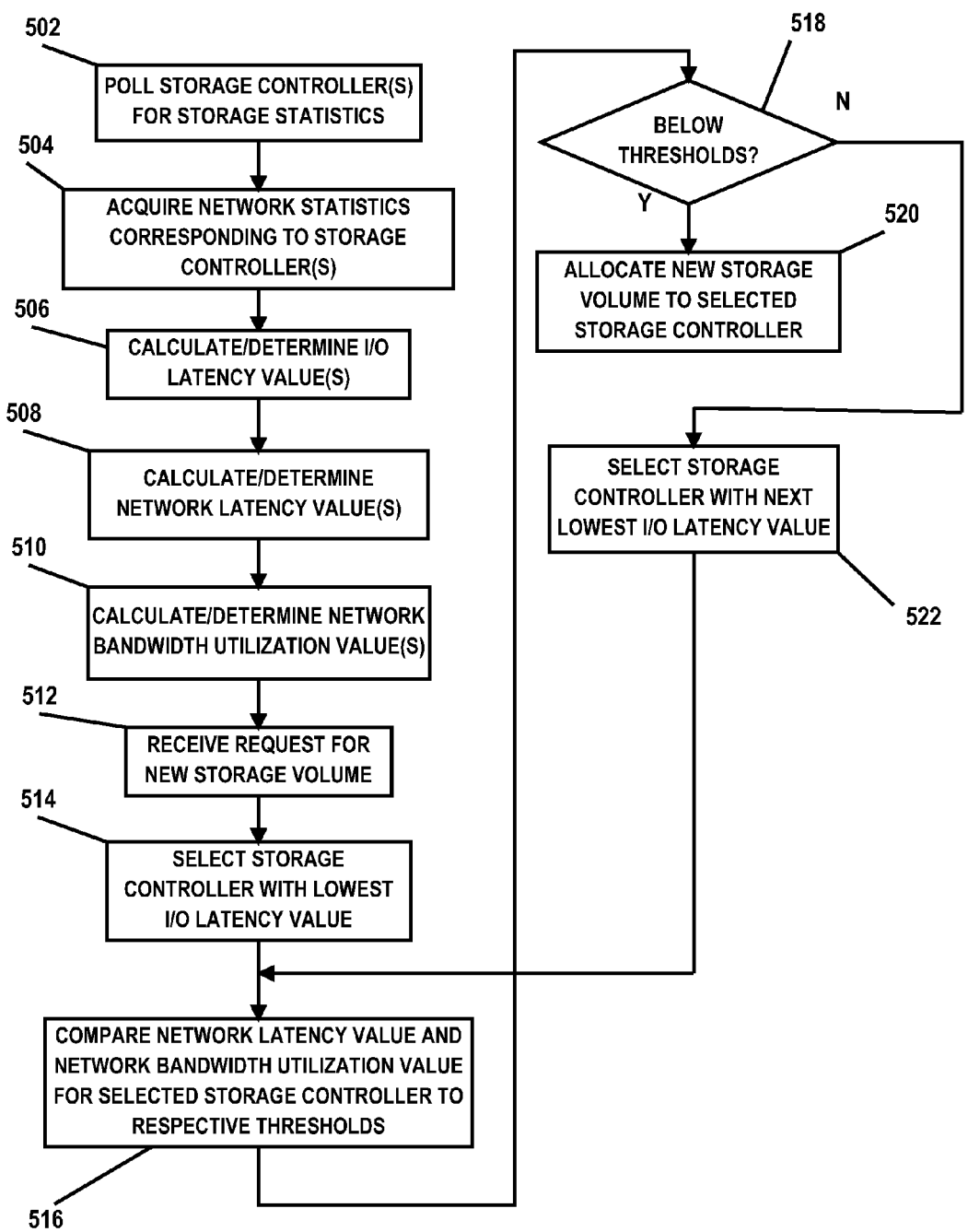
FIG. 5 depicts a flow diagram illustrating an embodiment of a method for allocating and balancing storage resources.

FIG. 5 is a flow diagram illustrating an embodiment of a method for storage management. The method begins at block 502, where management application polls storage controllers 430 for storage statistical information. At block 504, management application 420 acquires network statistics corresponding to respective storage controllers 430. At block 506, management application 420 calculates and/or otherwise determines I/O latency value 452 for each respective storage controller 430. At block 508, management application 420 calculates and/or otherwise determines network latency value 454 for each respective storage controller 430. At block 510, management application 420 calculates and/or otherwise determines network bandwidth utilization value 454 for each respective storage controller 430.

At block 512, a request is received to allocate a new storage volume in system 400. At block 514, management application 420 selects a particular storage controller 430 having a desired I/O latency value 452 (e.g., one having a lowest I/O latency value 452). At block 516, management application 420 compares network latency value 454 and network bandwidth utilization value 454 for the selected storage controller 430 to respective thresholds 462 and 464. At decisional block 518, a determination is made whether network latency value 454 and network bandwidth utilization value 454 for the selected storage controller 430 are below respective thresholds 462 and 464. If not (e.g., either one or both are not below a respective threshold 462 or 464), the method proceeds to block 522, where management application 420 selects another storage controller 430 (e.g., one with the next lowest I/O latency value 452). The method then proceeds to block 516. If at decisional block 518 it is determined that network latency value 454 and network bandwidth utilization value 454 for the selected storage controller 430 are below respective thresholds 462 and 464, the method proceeds to block 520, where management application 420 causes the new storage volume to be allocated to the selected storage controller 430. In some embodiments, if a selected storage controller 430 does not meets designated criteria for storage volume placement (or if management application 420 is unable to identify a particular storage controller 430 that meets designated criteria for storage volume placement), management application 420 may cause a rebalancing of storage volumes among storage controllers 430 to enable placement of the new storage volume.

Figure 6:
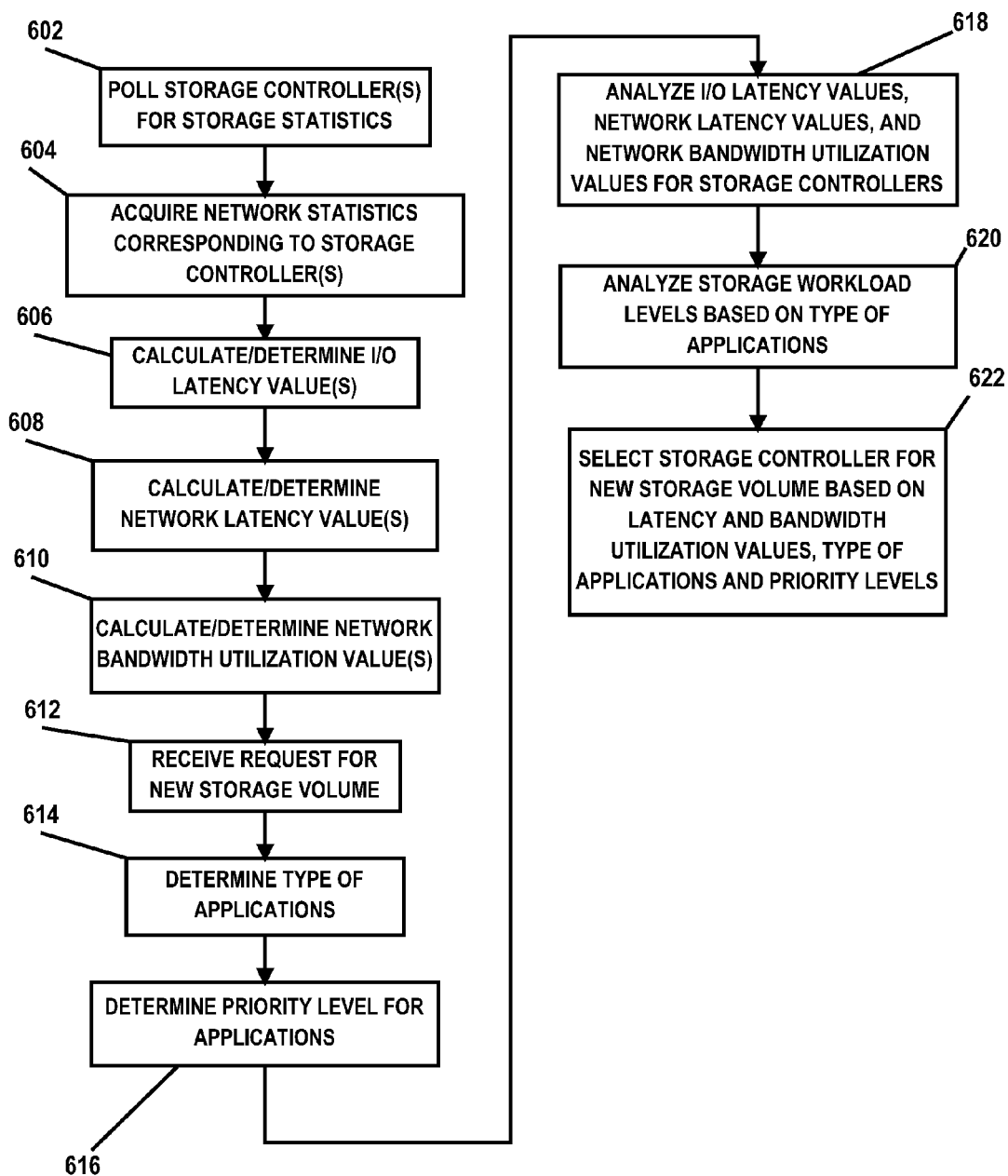
FIG. 6 depicts a flow diagram illustrating another embodiment of a method for allocating and balancing storage resources.

FIG. 6 is a flow diagram illustrating an embodiment of a method for storage management. The method begins at block 602, where management application polls storage controllers 430 for storage statistical information. At block 604, management application 420 acquires network statistics corresponding to respective storage controllers 430. At block 606, management application 420 calculates and/or otherwise determines I/O latency value 452 for each respective storage controller 430. At block 608, management application 420 calculates and/or otherwise determines network latency value 454 for each respective storage controller 430. At block 610, management application 420 calculates and/or otherwise determines network bandwidth utilization value 454 for each respective storage controller 430.

At block 612, a request is received to allocate a new storage volume in system 400. At block 614, management application 420 determines a type of application 414 that will be utilizing the new storage volume. Management application 420 may also determine the types of applications 414 currently utilizing storage resources via previously allocated storage volumes. At block 616, management application 420 determines a priority level for application 414 that will be utilizing the new storage volume. Management application 420 may also determine the priority levels of applications 414 currently utilizing storage resources via previously allocated storage volumes.

At block 618, management application 420 analyzes I/O latency value 452, network latency value 454 and network bandwidth utilization value 456 for respective storage controllers 430. At block 620, management application 420 determines and analyzes the storage workload level based on the types of applications 414 (e.g., the applications 414 currently utilizing storage resources and/or the application 414 that will be utilizing the newly allocated storage volume). At block 622, management application 420 selects a storage controller 430 to allocate a new storage volume to based on I/O latency values 452, network latency values 454, network bandwidth utilization values 456, the type of applications 414 utilizing the storage resources, and the priority levels of the various applications 414. For example, management application 420 may be configured to weight certain of the above-referenced criteria greater than others for selecting a storage controller 430. In some embodiments, a greater weight may be placed on a priority level of an application 414 currently utilizing a storage resource such that minimal disruption is desired for its respective storage controller 430 (i.e., the newly allocated storage volume being allocated to a different storage controller 430). In some embodiments, the anticipated workload level corresponding to the new storage volume to be allocated (e.g., based on the type of application 414 that will be utilizing the storage volume) may result in the unloading of a particular storage controller 430 (e.g., migrating one or more existing storage volumes to another storage controller) to facilitate the placement of the newly allocated storage volume on a desired storage controller 430. In some embodiments, management application 420 may evaluate the proximity of the I/O latency values 452, network latency values 454, and network bandwidth utilization values 456 to respective thresholds 460, 462 and 464 in connection with an anticipated storage workload level for the new storage volume to be allocated to determine which storage controller 430 should be selected for the new storage volume and/or whether one or more storage volumes should be migrated to other storage controllers 430 to rebalance or pre-balance (e.g., to achieve a balanced storage controller 430 workload once the new storage volume is allocated).

Figure 7:
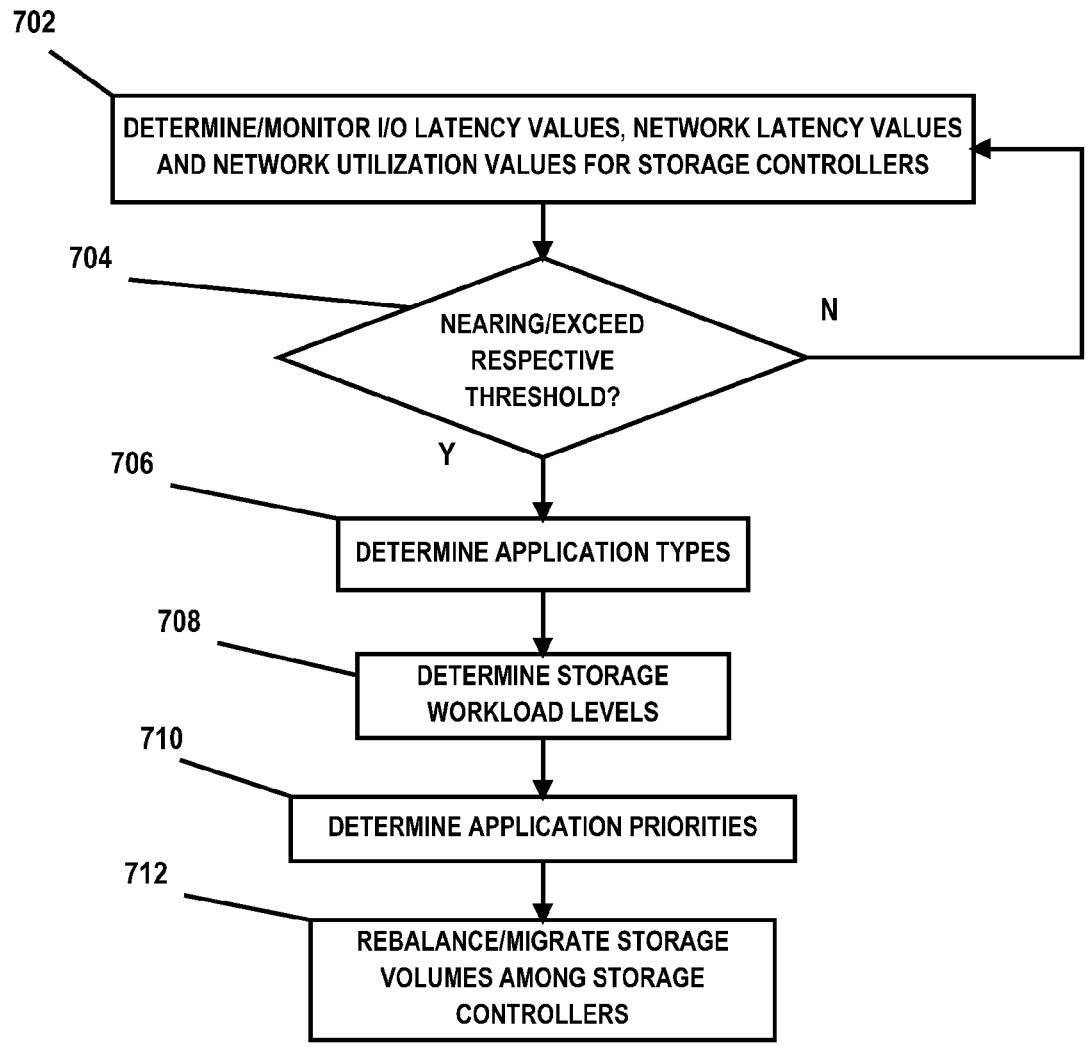
FIG. 7 depicts a flow diagram illustrating another embodiment of a method for allocating and balancing storage resources.

FIG. 7 is a flow diagram illustrating another embodiment of a method for storage resource management. The method begins at block 702, where management application 420 determines and monitors I/O latency values 452, network latency values 454, and network bandwidth utilization values 456 for respective storage controllers 430. At decisional block 704, a determination is made whether one or more of I/O latency values 452, network latency values 454, and network bandwidth utilization values 456 for a particular storage controller 430 is nearing or has exceeded a respective threshold 460, 462 or 464. If not, the method proceeds to block 702 where management application 420 continues to monitor I/O latency values 452, network latency values 454, and network bandwidth utilization values 456 for storage controllers 430. If a determination is made at block 704 that one or more of I/O latency values 452, network latency values 454, and network bandwidth utilization values 456 for a particular storage controller 430 is nearing or has exceeded a respective threshold 460, 462 or 464, the method proceeds to block 706, where management application 420 determines the types of applications 414 utilizing the storage resources controlled by storage controllers 430. At block 708, management application 420 determines storage workload levels for the different types of applications (e.g., based on current use and/or anticipated use of allocated storage volumes). At block 710, management application 420 determines a priority level associated with the applications 414 utilizing storage volumes. At block 712, management application 420 rebalances storage volumes among storage controllers 430 (e.g., migrating one or more storage volumes from one storage controller 430 to another storage controller 430). In some embodiments, management application 420 may rebalance storage volume placement among storage controllers 430 to maximize performance for applications 414 with higher priority levels. In some embodiments, management application 420 may rebalance storage volume placement among storage controllers 430 to compensate for network failures, high or increasing workload usage of storage volumes of a particular storage controller 430, and/or changes in prioritization of certain applications 414. For example, in some embodiments, despite I/O latency values 452, network latency values 454, and network bandwidth utilization values 456 being below respective thresholds 460, 462 and 464, a change to a priority level of a particular application 414 may cause storage volumes to be migrated to other storage controllers 430 to ensure that storage resources for the prioritized application 414 are not compromised (e.g., due to a network failure or workload level increase).

Thus, embodiments of the present disclosure enable efficient management of storage resources by monitoring and managing storage pool resources to maximize and/or otherwise maintain desired performance levels associated with operation response times. For example, embodiments of the present disclosure monitor I/O latency, network latency and network bandwidth utilization to determine storage volume placement and allocation. Further, embodiments of the present disclosure monitor I/O latency, network latency and network bandwidth utilization to determine whether storage volumes should be re-allocated and/or rebalanced among system storage controllers to reduce and/or minimize I/O latency, network latency and/or network bandwidth utilization for storage resources.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   determining, for each of a plurality of storage controllers, an input/output (I/O) latency value based on an I/O latency associated with each storage volume controlled by a respective storage controller;
   determining a network bandwidth utilization value and a network latency value corresponding to each storage controller;
   responsive to receiving a request to allocate a new storage volume, selecting a storage controller having a desired I/O latency value;
   determining whether the network bandwidth utilization value and the network latency value for the selected storage controller are below a respective network bandwidth utilization threshold and a network latency value threshold; and
   responsive to determining that the network bandwidth utilization value and the network latency value for the selected storage controller are below the respective network bandwidth utilization threshold and network latency value threshold, allocating the new storage volume to the selected storage controller.

2. The method of claim 1, wherein calculating an I/O latency value for each storage controller comprises calculating an average I/O latency value.

3. The method of claim 2, wherein calculating the average I/O latency for each storage controller comprises:
   calculating a weighted average I/O latency value for each storage volume controlled by a respective storage controller;
   summing the weighted I/O latency values of the storage volumes controlled by the respective storage controller; and
   dividing the summed I/O latency values by a quantity of the storage volumes controlled by the respective storage controller.

4. The method of claim 3, wherein calculating a weighted average I/O latency value for each storage volume comprises calculating a weighted average I/O latency value based on weighting write I/O operations greater than read I/O operations.

5. The method of claim 1, further comprising verifying that the I/O latency value for the selected storage controller is below a threshold I/O latency value.

6. The method of claim 1, further comprising:
   monitoring at least one of the I/O latency value, the network bandwidth utilization value and the network latency value for the storage controllers; and
   responsive to at least one of the I/O latency value, the network bandwidth utilization value and the network latency value for at least one storage controller exceeding a respective threshold, rebalancing storage volume distribution among the storage controllers.

7. The method of claim 1, further comprising:
   analyzing the I/O latency value, the network bandwidth utilization value and the network latency value for the storage controllers;
   determining whether moving one or more storage volumes will lower at least one of the I/O latency value, the network bandwidth utilization value and the network latency value for at least one storage controller; and
   responsive to determining that moving one or more storage volumes will lower at least one of the I/O latency value, the network bandwidth utilization value and the network latency value for at least one storage controller, migrating at least one storage volume from one storage controller to another storage controller.

8. A system, comprising:
   a plurality of storage controllers each controlling one or more storage volumes; and
   a processor unit operable to execute a management application, the management application configured to:
      determine, for each of the plurality of storage controllers, an input/output (I/O) latency value based on an I/O latency associated with each storage volume controlled by a respective storage controller;
      determine a network bandwidth utilization value and a network latency value corresponding to each storage controller;
      responsive to receiving a request to allocate a new storage volume, select a storage controller having a desired I/O latency value;
      determine whether the network bandwidth utilization value and the network latency value for the selected storage controller are below a respective network bandwidth utilization threshold and a network latency value threshold; and
      responsive to determining that the network bandwidth utilization value and the network latency value for the selected storage controller are below the respective network bandwidth utilization threshold and network latency value threshold, allocate the new storage volume to the selected storage controller.

9. The system of claim 8, wherein, responsive to determining that at least one of the network bandwidth utilization value and the network latency value for the selected storage controller are not below the respective network bandwidth utilization threshold and network latency value threshold, the management application is configured to rebalance one or more storage volumes among the plurality of storage controllers to enable the allocation of the new storage volume.

10. The system of claim 8, wherein the management application is configured to:
    determine a type of application to be utilizing the new storage volume;
    determine an anticipated storage workload corresponding to the application; and
    select a storage controller for allocation of the new storage controller based on the anticipated storage workload.

11. The system of claim 8, wherein the I/O latency value for each storage controller comprises a weighted average I/O latency value, wherein the weighting is based on a rate of I/O operations.

12. The system of claim 8, wherein the management application is configured to verify that the I/O latency value for the selected storage controller is below a threshold I/O latency value.

13. The system of claim 8, wherein the management application is configured to:
    monitor at least one of the I/O latency value, the network bandwidth utilization value and the network latency value for the storage controllers; and responsive to at least one of the I/O latency value, the network bandwidth utilization value and the network latency value for at least one storage controller exceeding a respective threshold, rebalance storage volume distribution among the storage controllers.

14. The system of claim 8, wherein the management application is configured to:
analyze the I/O latency value, the network bandwidth utilization value and the network latency value for the storage controllers;
determine whether moving one or more storage volumes will lower at least one of the I/O latency value, the network bandwidth utilization value and the network latency value for at least one storage controller; and
responsive to determining that moving one or more storage volumes will lower at least one of the I/O latency value, the network bandwidth utilization value and the network latency value for at least one storage controller, migrate at least one storage volume from one storage controller to another storage controller.

15. A computer program product for storage management, the computer program product comprising:
a non-transitory computer readable medium having computer readable program code embodied therewith, the computer readable program code comprising computer readable program code configured to:
determine, for each of a plurality of storage controllers, an input/output (I/O) latency value based on an I/O latency associated with each storage volume controlled by a respective storage controller;
determine a network bandwidth utilization value and a network latency value corresponding to each storage controller;
responsive to receiving a request to allocate a new storage volume, select a storage controller having a desired I/O latency value;
determine whether the network bandwidth utilization value and the network latency value for the selected storage controller are below a respective network bandwidth utilization threshold and a network latency value threshold; and
responsive to determining that the network bandwidth utilization value and the network latency value for the selected storage controller are below the respective network bandwidth utilization threshold and network latency value threshold, allocate the new storage volume to the selected storage controller.

16. The computer program product of claim 15, wherein the computer readable program code is configured to calculate an average I/O latency value for each storage controller.

17. The computer program product of claim 16, wherein the computer readable program code is configured to:
calculate an average I/O latency value for each storage volume controlled by a respective storage controller;
sum the I/O latency values of the storage volumes controlled by the respective storage controller; and
divide the summed I/O latency value by a quantity of the storage volumes controlled by the respective storage controller to derive the average I/O latency value for a respective storage controller.

18. The computer program product of claim 17, wherein the computer readable program code is configured to calculate a weighted average I/O latency value for each storage volume, wherein write I/O operations are weighted greater than read I/O operations.

19. The computer program product of claim 15, wherein the computer readable program code is configured to:
monitor at least one of the I/O latency value, the network bandwidth utilization value and the network latency value for the storage controllers; and
responsive to at least one of the I/O latency value, the network bandwidth utilization value and the network latency value for at least one storage controller exceeding a respective threshold, rebalance storage volume distribution among the storage controllers.

20. The computer program product of claim 15, wherein the computer readable program code is configured to:
analyze the I/O latency value, the network bandwidth utilization value and the network latency value for the storage controllers;
determine whether moving one or more storage volumes will lower at least one of the I/O latency value, the network bandwidth utilization value and the network latency value for at least one storage controller; and
responsive to determining that moving one or more storage volumes will lower at least one of the I/O latency value, the network bandwidth utilization value and the network latency value for at least one storage controller, migrate at least one storage volume from one storage controller to another storage controller.

* * * * *